Aug. 13, 1957  F. C. DANSEREAU  2,802,583
ROLLER CONVEYOR BOXCAR
Filed Feb. 9, 1955  2 Sheets-Sheet 1

INVENTOR.
FRANCIS C. DANSEREAU
BY Robert F. Hause
ATTORNEY

Aug. 13, 1957  F. C. DANSEREAU  2,802,583
ROLLER CONVEYOR BOXCAR
Filed Feb. 9, 1955  2 Sheets-Sheet 2
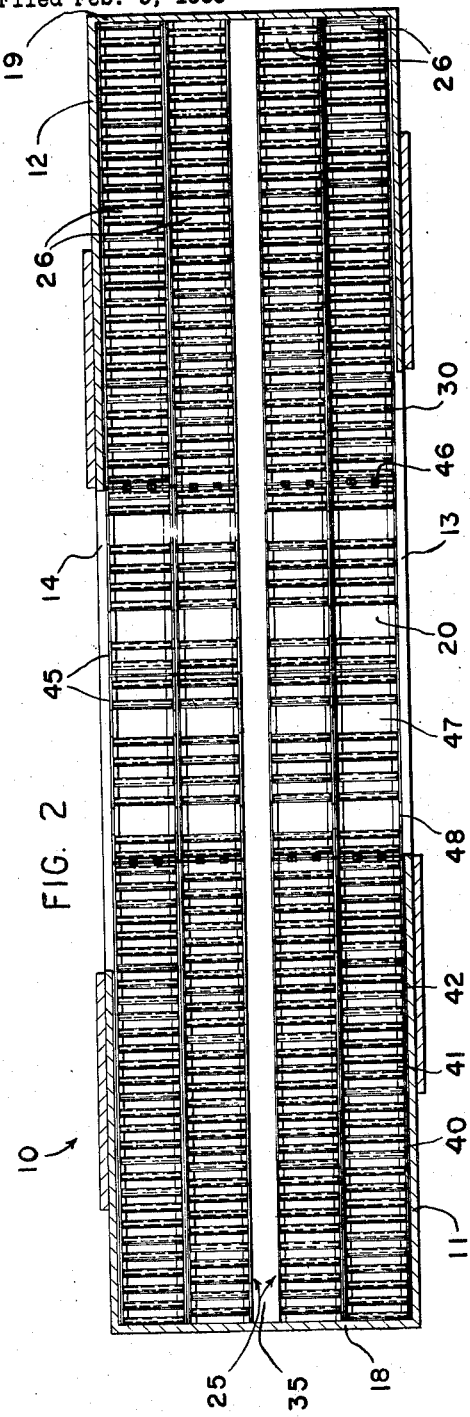
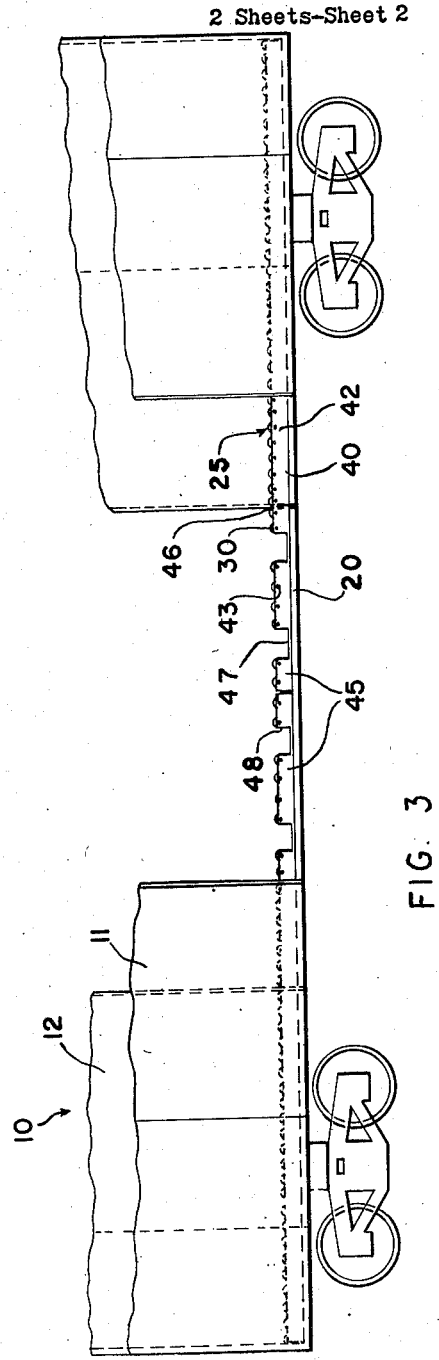
INVENTOR
FRANCIS C. DANSEREAU
BY
*Robert F. Hause*
ATTORNEY

United States Patent Office 2,802,583
Patented Aug. 13, 1957

2,802,583

ROLLER CONVEYOR BOXCAR

Francis C. Dansereau, Kenmore, N. Y., assignor to National Gypsum Company, Buffalo, N. Y., a corporation of Delaware Application February 9, 1955, Serial No. 487,070

2 Claims. (Cl. 214—84)

This invention relates to a roller conveyor structure particularly adapted for combination with a railway boxcar or the like, and is especially advantageous in the placement and removal of relatively large and difficult-to-handle material as exemplified by bound bundles of a plurality of gypsum wallboards, although it is in no way limited to the material used therewith.

Gypsum wallboard, as an example of material being shipped, is manufactured in approximately one-half inch thick sheets of 4' x 8', 4' x 10', 4' x 12' and 4' x 14'. These sheets, when bound into a bundle having in the order of one hundred sheets, as is desired for shipping, form a shipping unit of such considerable size and weight as to be quite impractical for unitary loading and unloading on railway boxcars.

Due to the prior lack of suitable means for handling such a bundle, a major portion of such material is still loaded and unloaded a few sheets at a time by hand. With the use of the usual fork lift truck alone, the size and shape of the above shipping units is such that loading with any degree of facility is practically impossible, except at the most accessible areas of the boxcar.

A further necessity in the usual loading of wallboard on standard boxcars is the use of pallets or the like, which require extra handling costs, and will ordinarily need be returned empty to the point of shipment. This is sometimes avoided by placing the wallboard on small stacks of sheets of smaller dimension gypsum lath, between which the truck forks may be lowered and withdrawn, and this process may be carried on only at the more accessible areas of a boxcar. This procedure also will obviously require special handling in properly placing and later removing the stacks of lath. To avoid, somewhat, the difficulties in loading and unloading, shippers will often attempt to mix loads, so that any one boxcar will contain only a portion of wallboard, filling the balance of the boxcar with materials easier to handle in loading and unloading. This avoidance of the worst difficulties of loading necessitates extra effort in scheduling, loading, and extra supervision during loading with the elimination of only a portion of the problem of wallboard handling. Due to the many problems involved and the variation in facilities available for unloading at various shipping points, shippers are required to provide any one of over a hundred loading systems to meet the unloading requirements in any one boxcar shipment.

It is an object of this invention to provide a means for loading and unloading boxcars and the like which is simple in operation and greatly facilitates rapid loading and unloading of bulky material which is otherwise difficult to handle. Briefly this is accomplished by the use of a novel roller conveyor and the combination thereof with a boxcar.

Another object of the invention is to provide a boxcar suitable for rapid loading and unloading of bulky material which avoids the need for pallets or the like.

A further object of the invention is to provide a novel roller conveyor system suitable for more rapid loading and unloading with standard fork lift trucks.

A further object of the invention is to provide a boxcar loading means adaptable to a large variation in unloading facilities.

These and other objects and advantages of the invention will appear more fully when considered in connection with the following detailed description of a preferred embodiment of the invention and the accompanying drawings in which:

Fig. 2 is a plan view of the roller conveyor system on the floor of a boxcar, constructed in accordance with and embodying the invention.

Fig. 3 is a side view of the lower portion of the boxcar shown in Fig. 2.

Description

Figure 1:
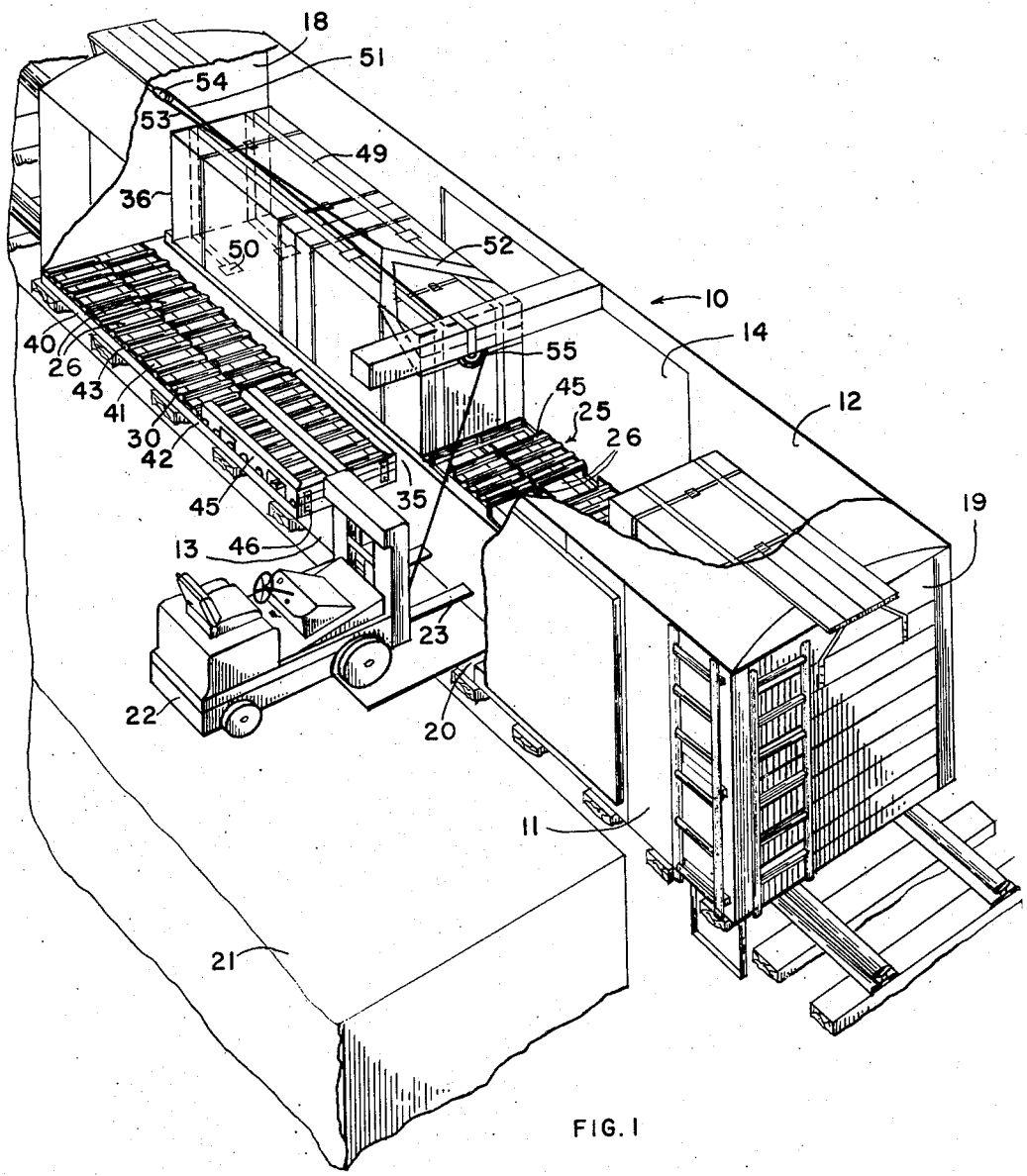
Fig. 1 is a persepective view of a boxcar built in accordance with and embodying the invention, parts being broken away.

Referring now to Fig. 1, there is shown a boxcar 10, with sidewalls 11 and 12, having doorways 13 and 14, offset one from the other in a lengthwise direction of car 10 in accordance with the standard construction of railway boxcars. Car 10 further includes end walls 18 and 19 and floor 20.

For a complete illustration of the practical application of the present invention, the boxcar 10 is shown disposed alongside a loading platform 21 constructed substantially coplanar with floor 20. A fork lift truck 22, having forwardly extending forks 23, is illustrated diagrammatically in operating position on platform 21.

A roller conveyor system 25 is attached to the boxcar floor 20 and consists, in the present embodiment, of four courses 26 of rollers 30, two courses on one side being spaced apart from the opposite two courses to provide an access aisle 35 extending centrally throughout the length of the boxcar for ease in the final strapping and securing of wallboard bundles 36 or other material. The proper number of courses is in general dependent on the weight of material to be handled thereon and the strength of materials used in the construction of the conveyor system. The construction of each course 26 is similar to that of the others and consists of opposed pairs of elongated, longitudinally extending L-frames 40, having a horizontal inwardly projecting base 41, fixed by any suitable means to floor 20, and a roller supporting, upwardly extending flange 42. Rollers 30 extend laterally between flanges 42, are spaced for freedom of rotation from opposed flanges 42, and extend vertically above the upper extent of flanges 42. Rollers 30 are rotatably mounted, parallel one to another, on roller shafts 43 which are mounted in horizontal alignment, in and extending between the opposed pairs of flanges 42.

Each course 26 is provided at its longitudinally central portion, at an area common to both car doorways, with hinged loading sections 45, the sections 45 being hinged as at 46, for folding endward of the car to provide access for loading and unloading the opposite side of the car, the arrangement being such that, whichever doorway is adjacent a loading platform, that doorway may be used for loading the two courses 26 opposite from the loading doorway by folding back the loading sections 45 adjacent the loading doorway. Any other means for mounting loading sections 45 capable of readily being removed by loaders would also be suitable.

Loading sections 45 have provided therein suitably spaced apart slots 47. No rollers are disposed at slots 47 and the flanges 42 are partially cutaway downward from the top edge thereof as at 48. Thus, the forks of a fork lift truck may be lowered into slots 47, to deposit a load on the rollers in the general area of the slots 47.

Four slots 47 in each course 26 are shown in the present embodiment, two in each loading section 45, allowing a degree of selectivity in the positioning of the load and further providing for variation in the spacing of forks, of the various fork lift trucks which may be used for loading and unloading.

Referring to Fig. 1, steel straps 49 and anchor plates 50, suitable for holding wallboard bundles 36, will be seen. The anchor plates 50 are located at various points on floor 20, whereat the ends of longitudinal load holding straps 49 may be conveniently fixed, preventing, sufficiently, any load shifting during transit.

To further facilitate loading of boxcar 10, a novel combination, with the conveyor boxcar 10, of tackle 51 is provided wherein a load engaging stirrup 52 is pulled endward by rope 53 extending about pulley 54, disposed on end wall 18, thence through pulley 55, disposed overhead of the center portion of the boxcar, thence laterally outward and attached to the fork lift truck 22, backing outward through door 13, after having deposited a load on a loading section 45.

Operation

Prior to loading, boxcar 10 is disposed with one doorway 13 adjacent a loading platform 21. The loading sections 45, adjacent the loading platform 21, are folded endward providing a cleared path to the opposite loading sections 45. Fork lift truck 22, having a bundle 36 of wallboard or the like, carries the load to a position over the opposite loading section, with the truck forks 23 disposed directly over and in line with a pair of slots 47. Forks 23 are lowered into slots 47 depositing bundle 36 on rollers 30. Rope 53 is attached to truck 22, stirrup 52 is disposed about the end of bundle 36, and truck 22 is backed out of doorway 13, pulling bundle 36 endwise of boxcar 10 to the desired position. The final bundle 36 to be disposed on the course 26 opposite door 13 would, when deposited on the rollers be in the final desired position without need of using the tackle 51.

The loading sections 45 adjacent doorway 13 are then folded downward for loading and bundles are deposited thereon similarly to the manner of loading the opposite loading sections. The stirrup and tackle are again employed for final positioning of the load. Straps 49 are placed longitudinally around all bundles and fixed tightly to anchor plates 50.

With the resultant reduction in handling and time, numerous factory loading problems are eliminated. A similar, but reverse, method of unloading, likewise benefits and eliminates problems of consumers and widely dispersed distributors.

Boxcar 10 and conveyor 25 may similarly be used on return trips with other goods. Alternatively single layers of flat board may be placed over the rollers for carrying goods not suited for loading directly on rollers. A still further alternative may include providing means, such as additional hinges for removing the conveyor system from the boxcar floor and disposing it preferably along the sidewalls 11, 12 during a return trip.

Having completed a detailed disclosure of a preferred embodiment of my invention so that those skilled in the art may practice the same, I contemplate that variations may be made without departing from the essence of the invention or the scope of the appended claims.

What is claimed is:

1. A vehicle freight compartment having an uninterrupted floor surface therethroughout, endwalls and sidewalls, a doorway in at least one of said sidewalls, and a roller conveyor system disposed on said floor, said system having a plurality of rollers rotatably mounted therein for supporting cargo and conveying said cargo longitudinally to and from a loaded position, all of said rollers having an axial extent substantially lateral of said vehicle, there being at least two longitudinally extending conveyor courses disposed laterally one from the other with independently rotatable rollers in each said course for the separate loading and unloading of at least two laterally separate rows of cargo material, said course adjacent said doorway having loading sections of a plurality of rotatable rollers of laterally extending axes, said loading sections being removably mounted on said uninterrupted floor surface laterally inward of said doorway, said loading section rollers being mounted in longitudinally extending frame members having a plurality of upwardly opening grooves for the reception and withdrawal of lift truck forks, said frame members each supporting rollers disposed longitudinally in both directions from said grooves, whereby said removably mounted loading sections are susceptible to fork lift loading and simultaneously susceptible to unitary removal for access to, and fork lift loading of, remote courses.

2. A vehicle freight compartment having an uninterrupted floor surface therethroughout, endwalls and sidewalls, a doorway in at least one of said sidewalls, and a roller conveyor system disposed on said floor, said system having a plurality of rollers rotatably mounted therein for supporting cargo and conveying said cargo longitudinally to and from a loaded position, all of said rollers having an axial extent substantially lateral of said vehicle, there being at least two longitudinally extending conveyor courses disposed laterally one from the other with independently rotatable rollers in each said course for the separate loading and unloading of at least two laterally separate rows of cargo material, said course adjacent said doorway having loading sections of a plurality of rotatable rollers of laterally extending axes, said loading sections being removably mounted on said uninterrupted floor surface laterally inward of said doorway, said loading section rollers being mounted in longitudinally extending frame members having a plurality of upwardly opening grooves for the reception and withdrawal of lift truck forks, said frame members each supporting rollers disposed longitudinally spaced from said grooves, whereby said removably mounted loading sections are susceptible to fork lift loading and simultaneously susceptible to unitary removal for access to, and fork lift loading of, remote courses.

References Cited in the file of this patent

UNITED STATES PATENTS

| Number | Name | Date |
|---|---|---|
| 1,900,867 | Olds | Mar. 7, 1933 |
| 2,096,958 | Clerc | Oct. 26, 1937 |
| 2,494,953 | Martin | Jan. 17, 1950 |
| 2,657,813 | Bullwinkle | Nov. 3, 1953 |
| 2,710,105 | Schwartz | June 7, 1955 |